US012391900B2

(12) United States Patent
Li et al.

(10) Patent No.: US 12,391,900 B2
(45) Date of Patent: Aug. 19, 2025

(54) METHOD FOR REMOVING SILVER MIRRORING FROM SURFACE OF BLACK-AND-WHITE NEGATIVE FILM

(71) Applicant: Shaanxi Normal University, Xi'an (CN)

(72) Inventors: Yuhu Li, Xi'an (CN); Jianxu Luo, Xi'an (CN); Zhihui Jia, Xi'an (CN); Ersudai Ma, Xi'an (CN); Yajun Zhou, Xi'an (CN)

(73) Assignee: SHAANXI NORMAL UNIVERSITY, Xi'an (CN)

( * ) Notice: Subject to any disclaimer, the term of this patent is extended or adjusted under 35 U.S.C. 154(b) by 506 days.

(21) Appl. No.: 17/972,943

(22) Filed: Oct. 25, 2022

(65) Prior Publication Data

US 2023/0130852 A1     Apr. 27, 2023

(30) Foreign Application Priority Data

Oct. 25, 2021   (CN) .......................... 202111243365.3

(51) Int. Cl.
   *C11D 1/825*     (2006.01)
   *G03C 11/06*    (2006.01)

(52) U.S. Cl.
   CPC .............. *C11D 1/825* (2013.01); *G03C 11/06* (2013.01)

(58) Field of Classification Search
   CPC ................................ C11D 1/825; G03C 11/06
   See application file for complete search history.

(56) References Cited

U.S. PATENT DOCUMENTS

2002/0098450 A1*   7/2002   Murabayashi ......... G03C 11/06
                                                        430/430

FOREIGN PATENT DOCUMENTS

CN       106027883 A   * 10/2016
CN       110577768 A   * 12/2019
(Continued)

OTHER PUBLICATIONS

English machine translation of the description of CN-110577768-A (Year: 2019).*
(Continued)

*Primary Examiner* — Mark F. Huff
*Assistant Examiner* — Boone Alexander Evans
(74) *Attorney, Agent, or Firm* — LOZA & LOZA LLP; Michael Fedrick

(57) ABSTRACT

A method is provided for removing silver mirroring from the surface of a black-and-white negative film by: mixing 80-100 parts by mass of triethanolamine, 0-10 parts by mass of glycerol and 0-10 parts by mass of a surfactant uniformly under stirring to produce a silver mirroring remover, where the surfactant is one or more of isomeric tridecanol polyoxyethylene (8) ether, polyethylene glycol 200, polyethylene glycol 400 or alkylphenol polyoxyethylene (10) ether; applying the silver mirroring remover onto the region of the surface of the negative film, where the silver mirroring occurs, allowing the film to stand for at least 30 minutes, and then blotting up the residual solution on the negative film; and soaking the negative film in n-butanol and cleaning it, and then blotting the residual solvent on the negative film, followed by air drying, to complete the removal of silver mirroring on the surface of the negative film.

9 Claims, 3 Drawing Sheets

(56) References Cited

FOREIGN PATENT DOCUMENTS

CN    112159735 A    1/2021
EP    0965883 A1    12/1999

OTHER PUBLICATIONS

English machine translation of the description of CN-106027883-A (Year: 2016).*
First Office Action and Search Report issued on Dec. 5, 2022 for counterpart Chinese Patent Application No. 202111243365.3 with machine translation, 8 pgs.
Search Report issued on Dec. 5, 2022 for counterpart Chinese Patent Application No. 202111243365.3 with machine translation, 4 pgs.
"Determination of the luminous transmittance and haze of transparent plastics," National Standard No. GB/T 2410-2008 of the People's Republic of China, issued by the Standardization Administration of China on Aug. 4, 2008, pp. 322-331.

* cited by examiner

Before repair  After repair

Photo developed before repair  Photo developed after repair

METHOD FOR REMOVING SILVER MIRRORING FROM SURFACE OF BLACK-AND-WHITE NEGATIVE FILM

CROSS-REFERENCE TO RELATED APPLICATIONS

This application claims the benefit of priority to Chinese Patent Application No. 202111243365.3, filed on Oct. 25, 2021, the contents of which is incorporated herein by reference in their entirety.

TECHNICAL FIELD

The present disclosure relates to the technical field of archival conservation and repair, and specifically to a method for removing silver mirroring from the surface of a black-and-white negative film.

BACKGROUND

Since its inception more than 180 years ago, photography has been one of the most important means for recording human social activities. Photographic films have become the media of human communication and cultural and artistic display. A large number of photographic films are collected in archives, memorials and museums at all levels in China, which have recorded rich image information of social development and change, and have important heritage values and historical values.

Black-and-white silver salt films are generally composed of an emulsion layer and a film base. The emulsion layer is the core component of the photographic film. The emulsion layer of an unexposed black-and-white silver salt negative film is composed of gelatin and silver halide which has a photosensitive imaging function. During the development and fixing process, the silver halide is reduced to elementary silver dispersed in the gelatin. Under prolonged ambient temperature and humidity changes, the gelatin will gradually age and degrade, break the polymer chains and reduce the binding to the particle in the image portion. The silver on the surface will increase the diffusion coefficient when the humidity is high, and leaching occurs on the surface, forming a silver colloidal layer. This defect is known as "silver mirroring", and the phenomenon is characterized by a blue or white metallic gloss by reflected light, when observed at a certain angle. By using a microscope, numerous grainy compounds can be seen all over the image layer of the negative film. This weakens the resolution of the negative film, blurring the recorded image information and causing a significant reduction in image quality.

Related treatment methods for the above problems were rarely reported, and only the use of abrasive paste or rubber as a removal method was recorded in early foreign literatures, but it was rarely applied in practice. Moreover, such methods are time-consuming and difficult to treat a large number of films. Meanwhile, the operation is uncontrollable and tends to scratch the films, especially for the films with fragile cellulose acetate as the film base, which are more prone to breakage.

Therefore, in order to better preserve a film with valuable image data so that the recorded image information thereon will not be blurred to affect the image quality after a long period of storage, there is an urgent need for an effective treatment to remove the silver mirroring from the surface of the negative film, without damaging the negative film itself.

SUMMARY

Based on this, the present disclosure provides a method for removing silver mirroring from the surface of a black-and-white negative film, to solve the technical problems that the silver mirroring removal method in prior art is time-consuming and difficult to process a large number of films, while the operation is uncontrollable and tends to scratch the negative films.

In order to achieve the above object, the present disclosure provides a method for removing silver mirroring from the surface of a black-and-white negative film, comprising the steps of:

S1: mixing 80-100 parts by mass of triethanolamine, 0-10 parts by mass of glycerol and 0-10 parts by mass of a surfactant uniformly under stirring to produce a silver mirroring remover, wherein the surfactant is one or more of isomeric tridecanol polyoxyethylene (8) ether, polyethylene glycol 200, polyethylene glycol 400 or alkylphenol polyoxyethylene (10) ether;

S2: applying the silver mirroring remover onto the region of the surface of the negative film, where the silver mirroring occurs, allowing the film to stand for at least 30 minutes, and then blotting up the residual solution on the negative film;

S3: soaking the negative film in n-butanol and cleaning it, and then blotting the residual solvent on the negative film, followed by air drying, to complete the removal of silver mirroring on the surface of the negative film.

As a further preferable embodiment of the present disclosure, the silver mirroring remover is produced by mixing 90 parts by mass of triethanolamine, 5 parts by mass of glycerol and 5 parts by mass of isomeric tridecanol polyoxyethylene (8) ether uniformly under stirring.

As a further preferable embodiment of the present disclosure, each of the triethanolamine, the glycerol and the surfactant is used in analytic reagent grade.

As a further preferable embodiment of the present disclosure, in step S2, the silver mirroring remover after standing is applied onto the region of the surface of the negative film, where the silver mirroring occurs, with a medical degreasing cotton dip. That is, use medical degreasing cotton dipped with silver mirroring remover to smear on the diseased area of the negative film.

As a further preferable embodiment of the present disclosure, in step S2, the negative film is allowed to stand for 30 to 90 minutes after applying the silver mirroring remover.

As a further preferable embodiment of the present disclosure, in step S2, the residual solution on the negative film is blotted up with a medical cotton swab or filter paper.

As a further preferable embodiment of the present disclosure, in step S3, the negative film is soaked in n-butanol and cleaned 2-3 times.

As a further preferable embodiment of the present disclosure, in step S3, the residual solvent on the negative film is blotted with filter paper.

As for the method for removing silver mirroring from the surface of a black-and-white negative film according to the present disclosure, by using the above technical solutions, it can be used for the repair of a negative film having silver mirroring defects, which can well remove the silver mirroring on the surface of the negative film to achieve the purpose of film repair. The repaired negative film has a reduced haze, so that the image clarity is enhanced, and the transmittance is improved, which is conducive to transmitting more visible light during the exposure of the negative film, making the details of the image clearer. Moreover, the silver mirroring remover solution used in the method for removing silver mirroring from the surface of a black-and-white negative film according to the present disclosure has little effect on the mechanical properties of the negative film and will not cause damage to the negative film.

BRIEF DESCRIPTION OF DRAWINGS

The present disclosure is further described in detail below in conjunction with the accompanying drawings and specific embodiments.

The purpose, functional features and advantages of the present disclosure will be further described with reference to the accompanying drawings in conjunction with the embodiments.

DETAILED DESCRIPTION

The present disclosure will be further described below in conjunction with the accompanying drawings and specific embodiments. The terms such as "top", "bottom", "left", "right", "middle" and "a" mentioned in the preferable embodiments are used only for clarity of the description and are not intended to limit the implementable scope of the present disclosure. The change or adjustment of the relative relationship thereof, without substantial change in the technical content, shall also be considered as the implementable scope of the present disclosure.

Figure 1:
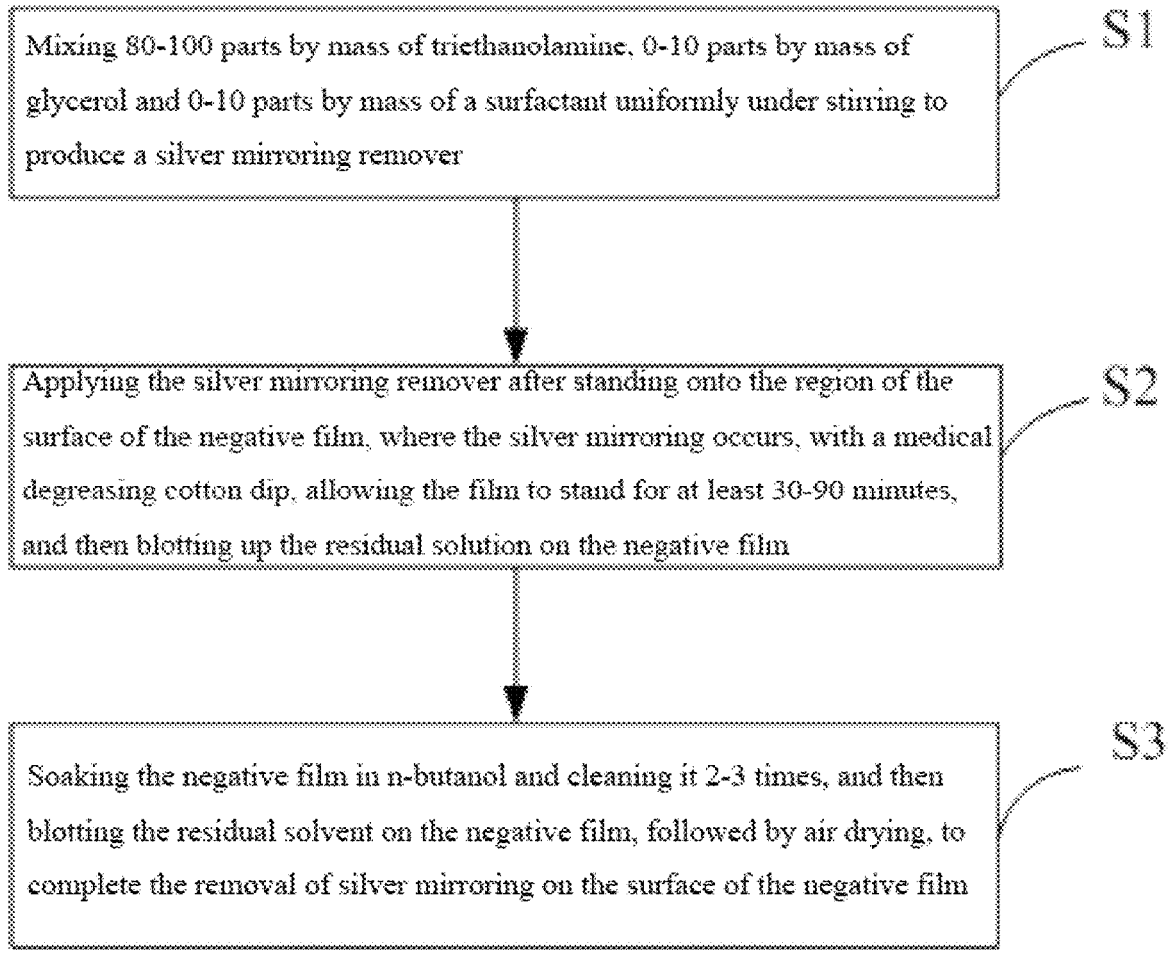
FIG. 1 is a process flow chart of an example of the method for removing silver mirroring from the surface of a black-and-white negative film according to the present disclosure.

As shown in FIG. 1, The present disclosure provides a method for removing silver mirroring from the surface of a black-and-white negative film, comprising the following steps.

S1: mixing 80-100 parts by mass of triethanolamine, 0-10 parts by mass of glycerol and 0-10 parts by mass of a surfactant uniformly under stirring to produce a silver mirroring remover.

In the above step S1, the surfactant may be one or more of isomeric tridecanol polyoxyethylene (8) ether, polyethylene glycol 200, polyethylene glycol 400 or alkylphenol polyoxyethylene (10) ether, preferably isomeric tridecanol polyoxyethylene (8) ether.

Preferably, since triethanolamine, glycerol and the surfactant may contain a solvent such as water or ethanol, and the solvent such as water and ethanol may have an effect on the negative film, each of triethanolamine, glycerol and the surfactant is used in analytic reagent grade, which can further improve the quality of the silver mirroring remover.

S2: applying the silver mirroring remover after standing onto the region of the surface of the negative film, where the silver mirroring occurs, with a medical degreasing cotton dip, allowing the film to stand for at least 30-90 minutes, and then blotting up the residual solution on the negative film.

The silver mirroring remover will generate bubbles during the preparation process due to stirring. The bubbles have a tension, which will prevent the applied silver mirroring remover from completely reacting with the silver mirroring, thereby affecting the removal effect. Therefore, in the above step S2, it is necessary to apply the silver mirroring remover after standing.

S3: soaking the negative film in n-butanol and cleaning it 2-3 times, and then blotting the residual solvent on the negative film, followed by air drying, to complete the removal of silver mirroring on the surface of the negative film.

By using the above method, the silver mirroring on the surface of the negative film can be well removed without damage to the negative film, so as to achieve the purpose of film repair.

In order to enable a person skilled in the art to further understand the technical content of the present disclosure, the technical solution of the present disclosure will be further described in detail below by specific examples.

Example 1

90 parts of triethanolamine, 5 parts of glycerol and 5 parts of isomeric tridecanol polyoxyethylene (8) ether were mixed uniformly under stirring to produce a silver mirroring remover. The silver mirroring remover left after standing was applied onto the region of the surface of a negative film, where the silver mirroring occurs, with a medical degreasing cotton dip, and left to stand for at least 60 min. Thereafter, the residual solution on the negative film was blotted up with a medical cotton swab or filter paper. The negative film was soaked in n-butanol and cleaned 3 times, and then the residual solvent on the negative film was blotted. After air drying, the removal of silver mirroring on the surface of the negative film was completed.

Figure 2:
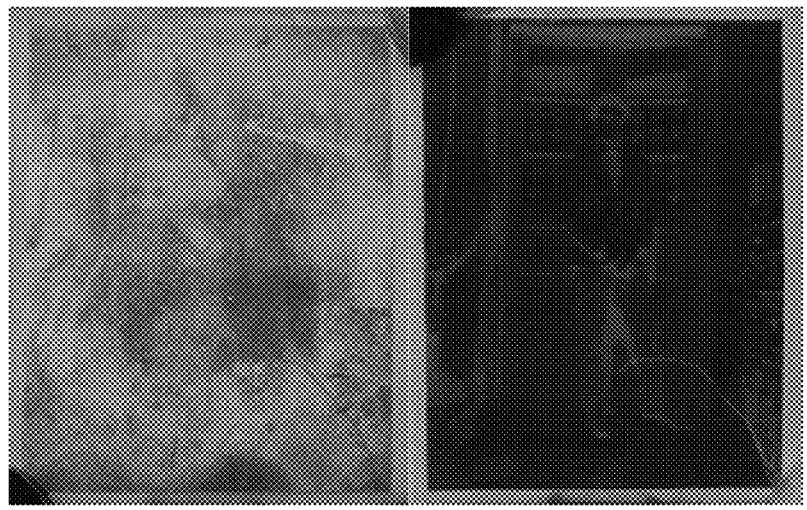
FIG. 2 is a comparison diagram of the negative film before and after repair.
Figure 3:
FIG. 3 is a comparison diagram of photos developed before and after repair of the negative film.

The repair of the negative film was achieved by removing the silver mirroring from the surface of the negative film. A comparison diagram of the negative film before and after repair is shown in FIG. 2, and a comparison diagram of photos developed before and after repair of the negative film is shown in FIG. 3. By comparison, it can be seen that the method of the present disclosure has a good repair effect on the negative film with silver mirroring defects, and the photos developed from the repaired film is clearer.

In order to further verify the repair effect of the method for removing silver mirroring from the surface of a black-and-white negative film proposed in the present disclosure on the negative film, the negative films before repair and the negative films after repair using the method for removing silver mirroring from the surface of a black-and-white negative film of the present disclosure were compared and tested with the following four testing methods.

Comparative Test 1

A total of five negative films with silver mirroring defects, numbered P1-P5, were tested for haze and transmittance before and after repair using CHN Spec TH-110 haze meter, with an aperture of 7 mm and a wavelength range of 400-700 nm, according to GB/T 2410-2008 "Determination of the luminous transmittance and haze of transparent plastics". The test data are shown in Table 1.

TABLE 1

| No. | | P1 | P2 | P3 | P4 | P5 |
|---|---|---|---|---|---|---|
| Haze | H1 (before repair) | 58.98 | 59.68 | 55.04 | 58.42 | 64.42 |
| | H2 (after repair) | 56.24 | 56.95 | 52.22 | 55.89 | 61.87 |
| | ΔH | 2.74 | 2.73 | 2.82 | 2.53 | 2.55 |

TABLE 1-continued

| No. | | P1 | P2 | P3 | P4 | P5 |
|---|---|---|---|---|---|---|
| Transmittance (%) | T1 (before repair) | 16.39 | 15.06 | 17.85 | 16.95 | 11.87 |
| | T2 (after repair) | 23 | 22.4 | 23.92 | 24.13 | 19.68 |
| | ΔT | 6.61 | 7.34 | 6.07 | 7.18 | 7.81 |

As can be seen from the data in Table 1, the silver mirroring remover can remove the silver mirroring very well. After the removal of silver mirroring, the haze is reduced significantly, and the image clarity is enhanced, while the transmittance is improved, so that more visible light can be transmitted during the exposure of the negative film, which results in richer image details and more accurate presentation of the original information.

Comparative Test 2

One negative film with silver mirroring defects was tested for the transmittance in the visible range on the surface of the negative film before and after repair, using a UV-Lambda 950 UV-NIR spectrophotometer with a wavelength range of 380-700 nm and a scan rate of 1 nm/s.

Figure 4:
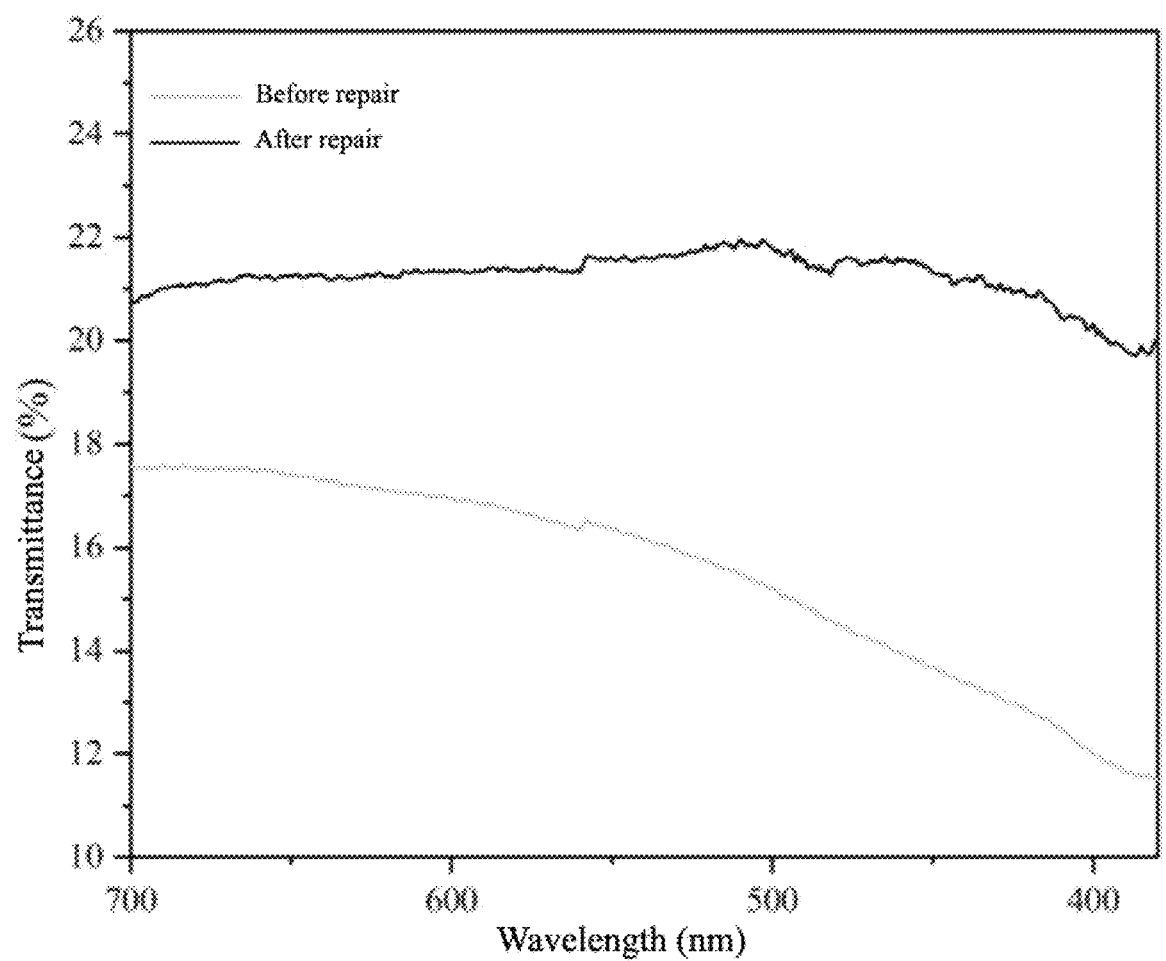
FIG. 4 is a comparison diagram of the transmittance of visible light on the surface of the negative film before and after repair.

As can be seen from FIG. 4, in the negative fil before repair, the transmittance gradually decreases as the wavelength increases; in the repaired negative film, the transmittance increases overall and the effect on exposure during development is reduced. The transmittance increases the most in the near-UV to cyan wavelength range due to the blue gloss of the silver mirroring.

Comparative Test 3

One film with silver mirroring defects was tested for the gloss of five different areas of the negative film before and after repair, using a WGG-60 microcomputer gloss meter. The measured data are shown in Table 2, where the five different areas are numbered P1-P5.

TABLE 2

| No. | | P1 | P2 | P3 | P4 | P5 |
|---|---|---|---|---|---|---|
| 60° Gloss (°) | Before repair | 116.4 | 111.6 | 119.6 | 115.8 | 123.5 |
| | After repair | 100.4 | 106.7 | 115.4 | 103.4 | 113.6 |

As can be seen from the data in Table 2, the reflection is enhanced due to the silver mirroring area showing a blue metallic gloss on the surface of the negative film, and the gloss diminishes when the silver mirroring is eliminated by the repair.

Comparative Test 4

A black-and-white negative film with cellulose triacetate as the film base was cut into five groups of 150×15 mm samples to be measured, using a scalpel. The samples to be measured were soaked in the prepared silver mirroring remover solution for 2 h, and then taken out and equilibrated at room temperature for 3 h. The samples were tested for folding endurance using a DC-MIT1358B computerized folding endurance tester. 10 samples were tested for each group, and the average value was taken. The samples were tested for tensile force using a J-KZ100 model pendulum tensile tester. 10 samples were tested for each group, and the average value was taken. According to the equation of tensile strength, the tensile strengths of the samples were calculated. The comparison data of the test are shown in Table 3, and the equation for calculating the tensile strengths of the samples is as follows:

$$S = \frac{F}{L_w}$$

where S is a tensile strength in kN/m; F is an average tensile force in N; and $L_w$ is a sample width in mm.

TABLE 3

| No. | | 1 | 2 | 3 | 4 | 5 |
|---|---|---|---|---|---|---|
| Tensile strength (kN/m) | Before soaking | 9.5 | 9.1 | 9.8 | 10.2 | 9.1 |
| | After soaking | 9.7 | 9.2 | 9.9 | 10.2 | 9.2 |
| Double fold number (times) | Before soaking | 11 | 11 | 12 | 12 | 11 |
| | After soaking | 12 | 11 | 13 | 12 | 11 |

As can be seen from the data in Table 3, the silver mirroring remover solution has little effect on the mechanical properties of the negative film and will not cause damage to the negative film.

In conclusion, the negative films having silver mirroring defects are repaired by the method for removing silver mirroring from the surface of a black-and-white negative film of the present disclosure. After the repair, the haze of the negative film is reduced, so that the image clarity is enhanced, while the transmittance is improved, which is conducive to transmitting more visible light during the exposure of the negative film, making the details of the image clearer. Moreover, the silver mirroring remover solution used in the method of the present disclosure has little effect on the mechanical properties of the negative film and will not cause damage to the negative film.

Although specific embodiments of the present disclosure are described above, those skilled in the art should understand that these are merely illustrative. Various changes or modifications can be made to such embodiments without departing from the principle and spirit of the present disclosure, and the protection scope of the present disclosure is limited only by the appended claims.

What is claimed is:

1. A method for removing silver mirroring from the surface of a black-and-white negative film, comprising the steps of:
   S1: mixing 80-100 parts by mass of triethanolamine, 0-10 parts by mass of glycerol and 0-10 parts by mass of a surfactant uniformly under stirring to produce a silver mirroring remover, wherein the surfactant is one or more of isomeric tridecanol polyoxyethylene (8) ether, polyethylene glycol 200, polyethylene glycol 400 or alkylphenol polyoxyethylene (10) ether;
   S2: applying the silver mirroring remover onto a region of the surface of the negative film, where the silver mirroring occurs, allowing the film to stand for at least 30 minutes, and then
   blotting up residual solution on the negative film; and
   S3: soaking the negative film in n-butanol and cleaning it, and then
   blotting residual solvent on the negative film, followed by air drying, to complete the removal of silver mirroring on the surface of the negative film.

2. The method for removing silver mirroring from the surface of a black-and-white negative film according to claim 1, wherein the silver mirroring remover is produced by mixing 90 parts by mass of triethanolamine, 5 parts by mass of glycerol and 5 parts by mass of isomeric tridecanol polyoxyethylene (8) ether uniformly under stirring.

3. The method for removing silver mirroring from the surface of a black-and-white negative film according to claim 1,
wherein each of the triethanolamine, the glycerol and the surfactant are of analytical reagent grade.

4. The method for removing silver mirroring from the surface of a black-and-white negative film according to claim 2,
wherein each of the triethanolamine, the glycerol and the surfactant are of analytical reagent grade.

5. The method for removing silver mirroring from the surface of a black-and-white negative film according to claim 1, wherein in step S2, the silver mirroring remover after standing is applied onto the region of the surface of the negative film, where the silver mirroring occurs, with a medical degreasing cotton dip.

6. The method for removing silver mirroring from the surface of a black-and-white negative film according to claim 1, wherein in step S2, the negative film is allowed to stand for 30 to 90 minutes after applying the silver mirroring remover.

7. The method for removing silver mirroring from the surface of a black-and-white negative film according to claim 1, wherein in step S2, the residual solution on the negative film is blotted up with a medical cotton swab or filter paper.

8. The method for removing silver mirroring from the surface of a black-and-white negative film according to claim 1, wherein in step S3, the negative film is soaked in n-butanol and cleaned 2 or 3 times.

9. The method for removing silver mirroring from the surface of a black-and-white negative film according to claim 1, wherein in step S3, the residual solvent on the negative film is blotted with filter paper.

\* \* \* \* \*